Feb. 23, 1937.        D. W. LLOYD        2,071,753
SAFETY CAR EQUIPMENT
Filed Nov. 16, 1933        4 Sheets—Sheet 1
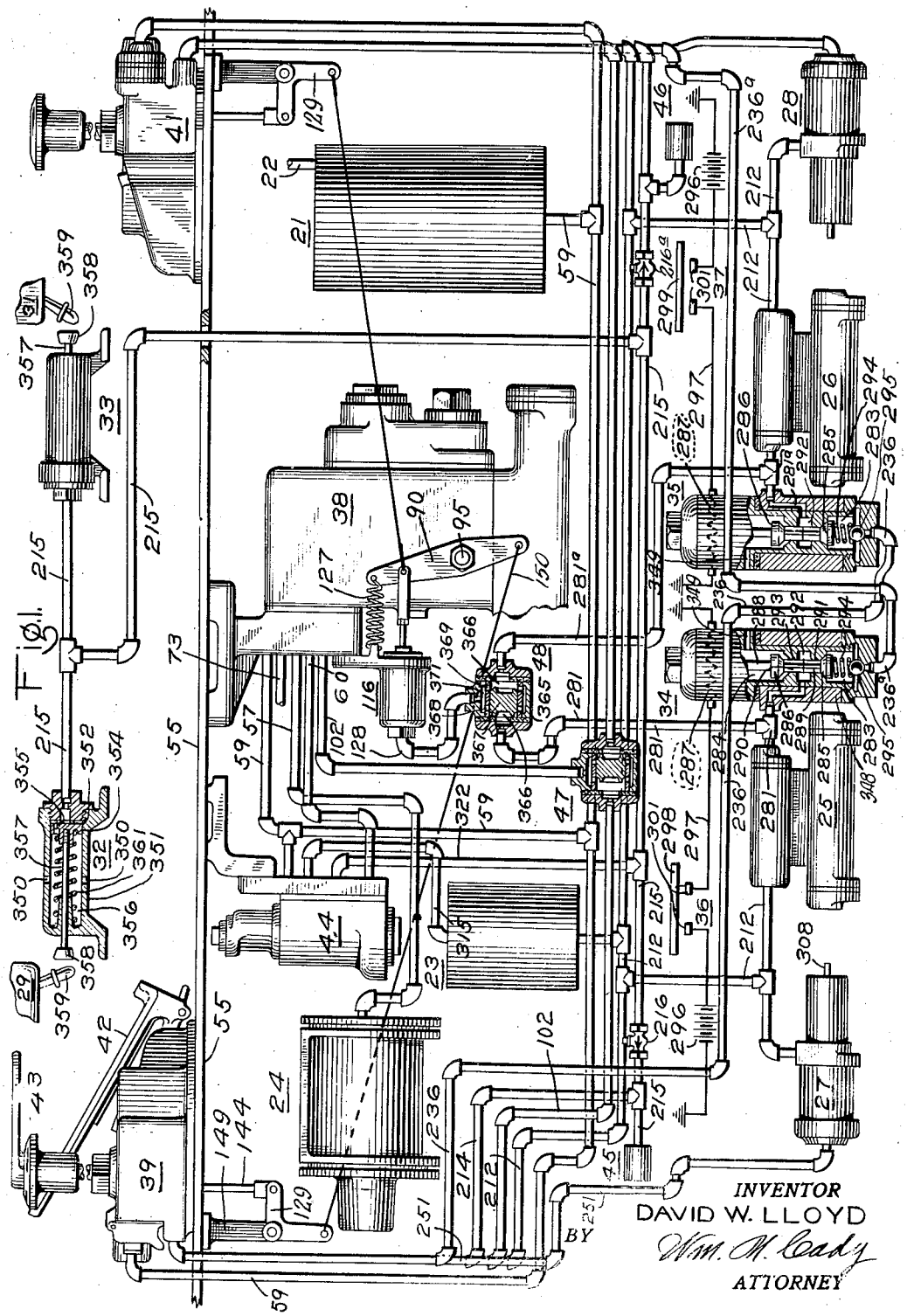
INVENTOR
DAVID W. LLOYD
BY  *Wm. M. Cady*
ATTORNEY

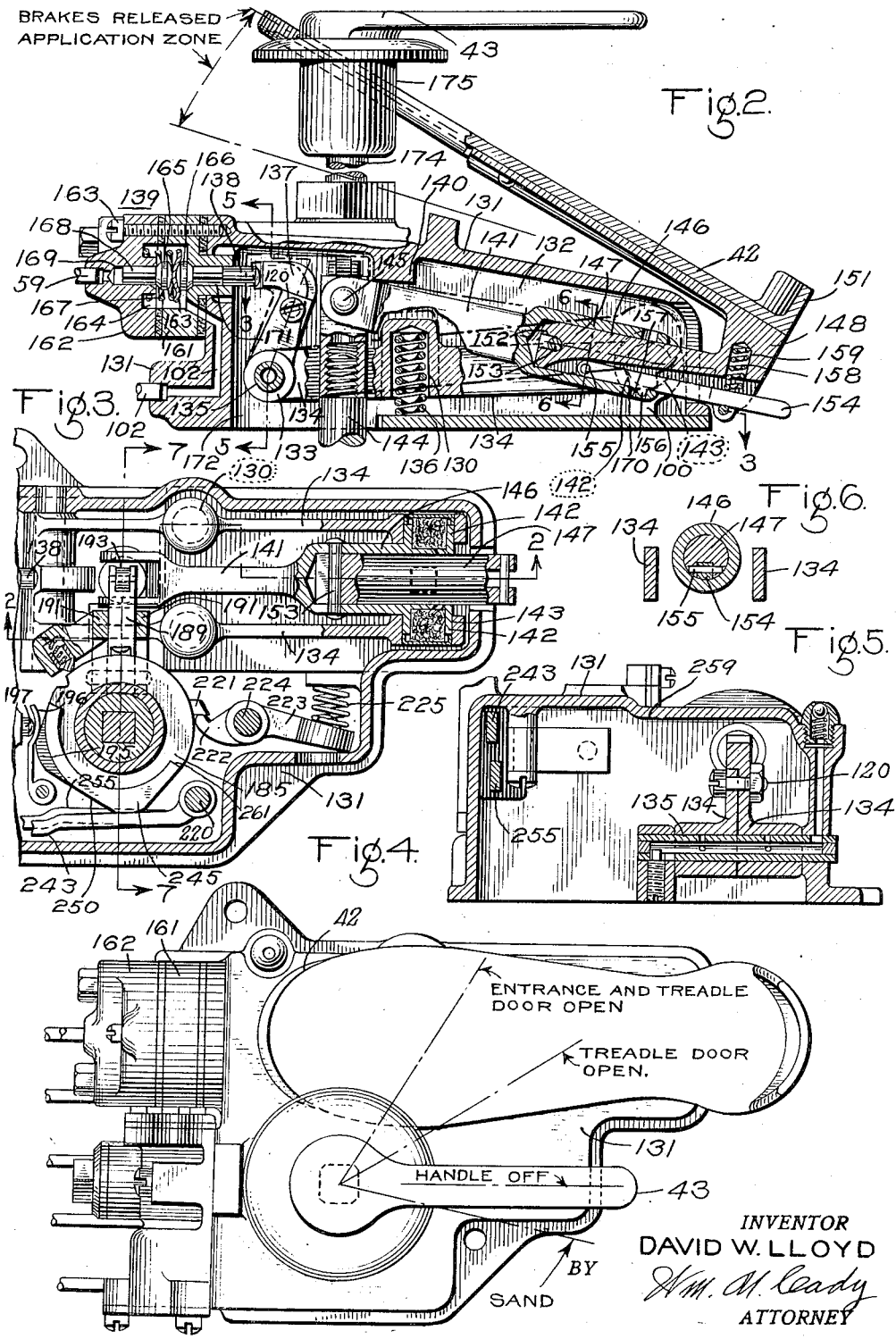

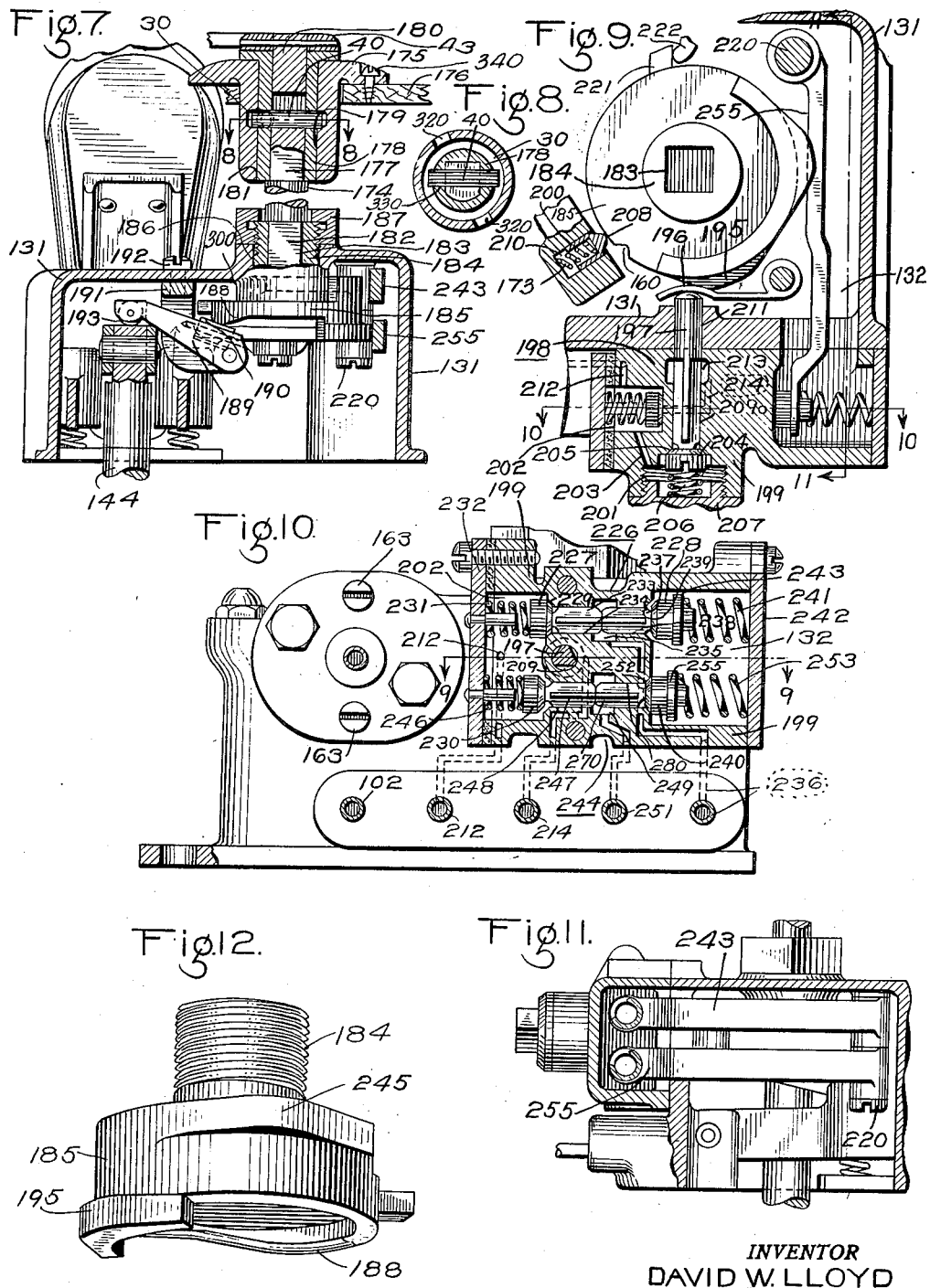

Feb. 23, 1937.  D. W. LLOYD  2,071,753
SAFETY CAR EQUIPMENT
Filed Nov. 16, 1933  4 Sheets-Sheet 4
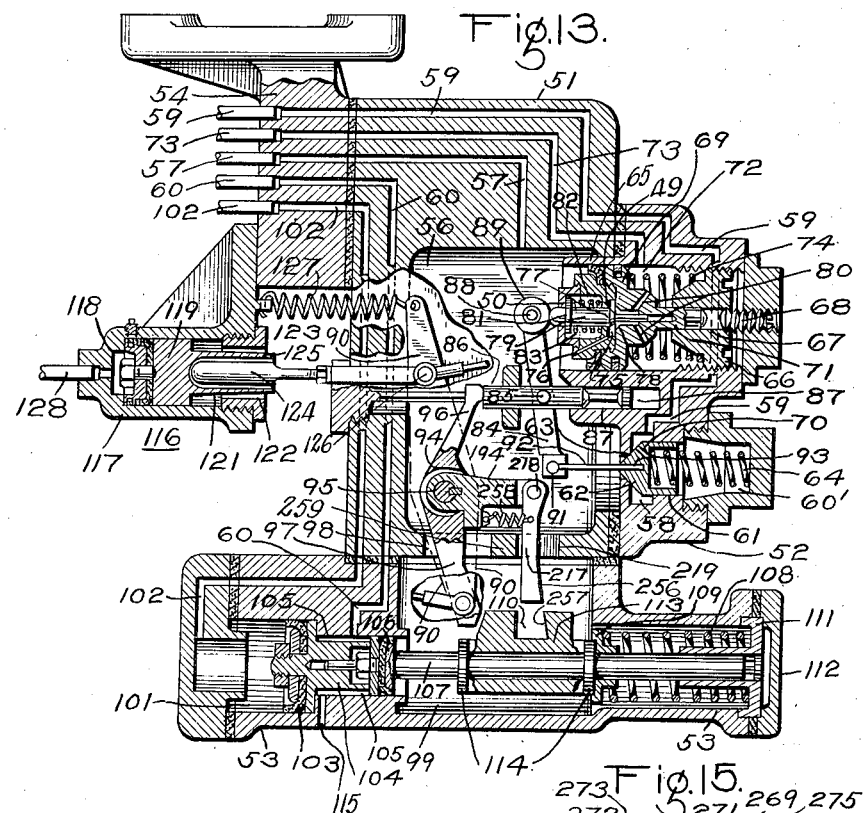
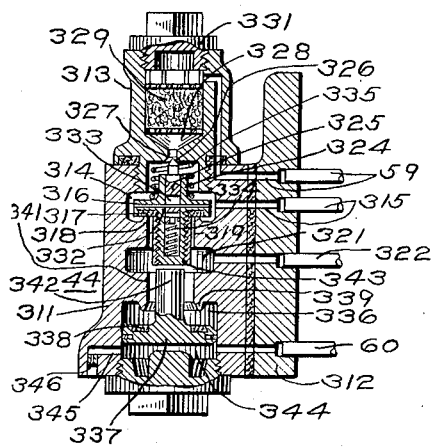
INVENTOR
DAVID W. LLOYD
BY Wm. N. Cady
ATTORNEY Patented Feb. 23, 1937

2,071,753

UNITED STATES PATENT OFFICE 2,071,753

SAFETY CAR EQUIPMENT

David W. Lloyd, Clayton, Mo., assignor to The Westinghouse Air Brake Company, Wilmerding, Pa., a corporation of Pennsylvania Application November 16, 1933, Serial No. 698,242

19 Claims. (Cl. 303—6.1)

This invention relates to control apparatus for fluid pressure actuated equipment and particularly to control apparatus for controlling the fluid actuated brakes, door engines and appurtenant devices and sanding equipment of motor driven passenger vehicles such as transit coaches and motor busses.

One type of fluid actuated equipment of a motor driven passenger vehicle comprises fluid pressure brake equipment, a self-lapping brake valve device for controlling the brake equipment and an emergency device for effecting an emergency application of the brakes when the operator's foot is removed from the foot pedal, so that in the event of any incapacitation of the motorman, such as sudden illness or death, the consequent release of pressure on the foot pedal will cause what is commonly known as "dead man's emergency application" of the brakes.

Further equipment includes door engines that are fluid pressure actuated for opening and closing the doors for permitting ingress and egress of passengers, treadle door engines controlled by a passenger actuated treadle, sanding devices whereby sand is discharged upon the rails from a box on the vehicle, circuit breakers or line switches for controlling the supply of electric current to the driving motors of the vehicles and fluid actuated circuit breaker opening or "knockout" devices for opening said circuit breakers under "dead man's emergency" operating conditions.

An object of this invention is to provide improved control equipment for the fluid actuated apparatus for a passenger vehicle wherein the brake valve device of the self-lapping type, is normally adapted to be actuated by a foot pedal, but in which a hand lever normally employed for controlling the opening and closing of the car doors is adapted to operate the brake valve device to apply the brakes in case the brakes have not been applied by operation of the foot pedal.

Another object of the invention is to provide a self-lapping brake valve device with means operated when the operator becomes incapacitated for causing said brake valve device to operate to effect an application of the brakes.

A further object of the invention is to provide a brake valve device and operating foot pedal therefor having the above noted characteristics wherein means are provided for enabling removal of the operator's foot from the pedal without effecting dead man's emergency application of the brakes, but only in the event that a service application of the brakes has previously been made which is sufficient to bring the car or vehicle to rest.

A further object of the invention is to provide door engine equipment for the entrance and exit or treadle doors of the vehicle and control means therefor wherein the door engine control equipment is so interlocked with the brake application effecting equipment that the doors can be opened only when the brakes are applied sufficiently to bring the vehicle to rest and in the case of the exit or treadle door, only when an outgoing passenger is standing upon a door release effecting control treadle.

A further object of the invention is to provide a door control equipment having the above noted characteristics wherein the treadle door control equipment is so interlocked with the brake control equipment that the brakes cannot be released so long as the treadle is depressed by an outgoing passenger.

A further object of the invention is to provide safety control apparatus for passenger or other vehicles wherein the sanding, door operating and circuit breaker opening equipment is actuated by fluid supplied from the same reservoir, to which the supply of fluid is cut off during dead man's emergency brake application operating conditions, so that the fluid pressure on the door engines may be balanced upon exhaustion of the reservoir as it blows down to atmosphere through the sand box and knockout devices in a manner to be described, thereby permitting the doors to be opened manually, so that a predetermined quantity of sand only may be discharged from the sand box under "dead man's emergency" operating conditions, and so that the fluid pressure on the circuit breaker opening device is balanced when the reservoir is exhausted in order that the circuit breakers may be returned manually to closed position.

A further object of the invention is to provide a safety control equipment for passenger vehicles that is flexible in operation and wherein the operation of the equipment in proper sequence is positively insured under both service and emergency brake application operating conditions.

These and other objects of the invention that will be made apparent throughout the further description thereof are attained in the control apparatus herein described and illustrated in the accompanying drawings wherein;

Fig. 1 is a diagrammatic elevational view, partly in section, of the safety car control equipment embodying features of the invention;

Fig. 2 is a vertical sectional view, partly in elevation, of the foot pedal and hand lever control apparatus taken on the broken line 2—2 of Fig. 3;

Fig. 3 is a horizontal sectional view, of the apparatus shown in Fig. 2, taken on the broken line 3—3 of Fig. 2, with the parts in handle off position;

Fig. 4 is a top plan view of the control apparatus shown in Fig. 2;

Fig. 5 is a vertical sectional view of the apparatus shown in Figs. 2 and 3 taken on the line 5—5 of Fig. 2;

Fig. 6 is a sectional view of a detail taken on the line 6—6 of Fig. 2;

Fig. 7 is a vertical sectional view of the apparatus shown in Figs. 2 and 3 taken on the line 7—7 of Fig. 3, with the parts in door open position;

Fig. 8 is a sectional view of a detail taken on the line 8—8 of Fig. 7;

Fig. 9 is a horizontal sectional view, partly in elevation, of the apparatus shown partly in Figs. 2, 3 and 10, taken on the line 9—9 of Fig. 10;

Fig. 10 is a vertical sectional view of the apparatus shown in Figs. 3 and 9 taken on the line 10—10 of Fig. 9;

Fig. 11 is a vertical sectional view, partly in elevation, of the apparatus partly shown in Figs. 3 and 9 and taken on the line 11—11 of Fig. 9;

Fig. 12 is a perspective view of the cam shown in Figs. 3, 7 and 9;

Fig. 13 is a vertical sectional view, partly in elevation, of an improved brake valve device shown in Fig. 1;

Fig. 14 is an elevational view of an automatic sanding valve device shown in Fig. 1;

Fig. 15 is a vertical sectional view of an exit or treadle door engine shown in Fig. 1; and Fig. 16 is a vertical sectional view of an entrance door engine shown in Fig. 1.

Referring to the drawings and particularly to Fig. 1, the apparatus includes a main reservoir 21, supplied with fluid under pressure from a compressor, not shown, through a pipe 22, a sanding reservoir 23, a brake cylinder 24, front and rear exit or treadle door engines 25 and 26, respectively, front and rear entrance door engines 27 and 28, respectively, front and rear motor controlling circuit breakers or line switches 29 and 31, respectively, front and rear circuit breaker opening or "knock-out" cylinder devices 32 and 33, respectively, front and rear magnet valve devices 34 and 35, respectively, for actuating the door engine valves and which are controlled by front and rear treadle switches 36 and 37, respectively, a self-lapping brake valve device 38, front and rear manual control devices 39 and 41, respectively, that are adapted to be actuated by a removable foot pedal 42 and a removable hand lever 43, an automatic sanding valve device 44, front and rear sand boxes 45 and 46, respectively, and double check valve devices 47 and 48.

The brake valve device 38 which is of the self-lapping type comprises a casing having a main section 51, a valve section 52, an emergency piston section 53 and a pipe bracket section 54 by means of which the brake valve device is secured to the frame 55 of the vehicle. The sections 52, 53 and 54 are removably secured to the main casing 51 by any desired means, not shown.

The casing sections 51, 52 and 53 when secured together in the manner described, define a pressure chamber 56 which may be constantly in communication with the usual brake cylinder 24 through a passage and pipe 57.

The casing section 52 is provided with a chamber 58 with which the usual main reservoir 21 is in constant communication through a pipe and passage 59. Contained in the chamber 58 and slidably mounted in a bore 61 in the casing section 52 is a supply valve 62 which is adapted to seat on a valve seat 63 carried by the casing section 52, and which is subject on one side to the pressure of a coil spring 64. This valve is operated to control communication from the chamber 58 to the chamber 56.

The casing section 52 is provided with a cylinder 65 which is open at one end to the chamber 56, the other end of the cylinder being closed by an adjusting member 66 which has screw-threaded connection with the casing section 52. This adjusting member is provided with a central bore 67 which, on its outer end, is tapped to receive a screw-threaded stop member 68.

Operatively mounted in the cylinder 65, adjacent to its open end, is a movable abutment in the form of a piston 69 having a stem 71 which is slidably guided in the member 66 within the inner end of the bore 67. At one side of the piston 69 there is a chamber 72 which is constantly open to the atmosphere through a passage and pipe 73. Contained in the chamber 72 is a coil spring 74 which is interposed between and engages the inner face of the piston 69 and an inner face of the adjusting member 66.

Contained in a valve chamber 75 in the piston 69 which is open to the pressure chamber 56 through a passage 76, is an exhaust or release valve 77 which is adapted to seat on a valve seat 78 formed on the piston, and which is adapted to control communication from the valve chamber 75 to the chamber 72 by way of connected passages 80 in the piston stem 71. The exhaust valve 77 is provided with a stem 79 having a collar 81 which slidably engages the piston 69 within a central bore 82 and is subject to the pressure of a light coil spring 83 interposed between and engaging the collar 81 and an annular flange 49 on the piston. Inward movement of the valve 77 relative to the piston is limited by the collar 81 engaging a stop flange 50 carried by the piston 69. The outer end portion of the valve stem 79 extends beyond the outer face of the piston 69 and is adapted to be operatively engaged by an operating mechanism which will now be described.

For controlling the operation of the supply and exhaust valves 62 and 77, respectively, a mechanism is provided comprising spaced levers 84, one of which is shown, which are pivotally connected, intermediate their ends, to a pin 85 mounted on a plunger 86 which at one end is slidably guided by the casing section 52 within a bore 87.

At one side of the pivot pin 85 the ends of the levers 84 are connected together through the medium of a pin 88 and loosely mounted on the pin 88 and disposed between the levers is a roller 89 which is adapted to operatively engage the outer end of the exhaust valve stem 79. At the other side of the pivot pin 85, the ends of the levers are connected together by means of a pin 91 on which one end of an operating rod 92 is pivotally mounted, the opposite end of the rod operatively engages one side of the supply valve 62 within a recess 93 formed in the valve.

For the purpose of operating the plunger 86, a rocking lever 94 is provided which is loosely mounted upon a rocking shaft 95 and which is provided with an arm 96 adapted to operatively engage the outer end of the plunger 86. The shaft 95 is mounted for oscillation in the casing section 52 and is adapted to be oscillated by a rocking lever 90 that is fixed to the outer end of the shaft exteriorly of the casing section 52, portions of the lever being shown in full line in Fig. 13. The rocking lever 94 is also provided with an arm 97 which extends through an opening 98 in the casing section 52 into a chamber 99 in the casing section 53, the purpose of which will hereinafter appear.

Within the emergency device casing 53 is a chamber 101 that is in communication with a safety control passage or pipe 102 and which contains a piston 103 having a stem 104 extending into a bore 105 which opens into the chamber 99 in the casing 53. A piston 106 is slidably mounted within the bore 105 and is provided with a stem 107 which extends through the chamber 99 and which is biased toward the left or emergency position by means of a spring 108 that is disposed between a collar 109 which bears against a flange 114 on the stem and the guide bushing 111 which is clamped between the casing 53 and a closure cap 112. A latch block 113 is fixed upon the stem 107 between the flanges 114.

The pistons 103 and 106 are normally held in the right-hand position shown in Fig. 13, by means of fluid under pressure supplied to the chamber 101 through the safety control pipe and passage 102 against the opposing pressure of the spring 108. When the pressure of the fluid within chamber 101 is reduced, as will hereinafter be explained, the spring 108 forces the stem 107 and the pistons 106 and 103 to the left or emergency position wherein the piston 106 is disposed between the passage 60 leading to the piston 337 of the emergency sanding valve device 44 and the exhaust passage 115, thereby closing communication from the passage 60 to the atmosphere and opening communication between the passage 60 and the chamber 99 through the bore 105, for a purpose that will hereinafter appear.

Associated with the brake valve device is an emergency interlock piston device 116 comprising a casing 117 having a chamber 118 containing a piston 119 that is provided with a stem 121 which extends exteriorly of the casing 117, through a bore 122 in a bushing 123 secured to the casing 117. A plunger 124 is mounted for a limited universal movement within a recess 125 in the stem 121 and is pivotally connected to the brake valve device operating lever 90 by a pin 126. A spring 127 connected at one end to the casing 117 and at the other end to the end of the lever 90 serves to normally retain the operating levers in the release position shown in Fig. 13 and the piston 119 in its extreme left position as shown. When the pressure of the fluid within the chamber 118 supplied thereto through the pipe 128, in a manner to be hereinafter described, is sufficient to overcome the tension of the spring 127, the operating lever 90 is moved toward application position for the purpose of effecting an application of the brakes as will hereinafter appear. The emergency interlock piston device 116 is not a part of my invention but is described and claimed in the copending application of Ellis E. Hewitt, Serial No. 698,231, filed November 16, 1933, and assigned to the assignee of this application.

A lever 194 is keyed upon the shaft 95 for movement therewith and carries a latch bar 217 that is pivotally connected to the lever 194 by a pin 218. The latch bar extends through a guide opening 219 in the casing 52, into the chamber 99 of the emergency piston device so that it registers with a notch 110 in the block 113 carried by the piston stem 107, when the piston stem is in the position shown in Fig. 13. The right face of the latch bar 217 is provided with an inclined surface 256 that is adapted to engage and cooperate with a similarly inclined wall 257 of the notch 110 for a purpose that will hereinafter appear. A spring 258 that is attached at one end to the lever 194 and at the other end to the latch bar 217 serves to yieldingly retain the latch bar against the wall 259 of the guide opening 219. When the shaft 95 is turned in a clockwise direction, Fig. 13, by the operating lever 90, the lever 194 is turned in a clockwise direction to engage and rotatively move the lever 94 in a clockwise direction to effect movement of the plunger 86 to the right, and the lock bar 217 is moved downwardly so that the lower end thereof enters the notch when the plunger 86 has been moved sufficiently to produce a brake cylinder pressure sufficient to bring the vehicle to rest, for example, such as a brake cylinder pressure of twenty-five pounds, and, as will hereinafter be explained, when the lock bar 217 is in the notch 110, the operator may remove his foot from the foot pedal without effecting an emergency application of the brakes.

The manual operating mechanism for the brake valve device is disclosed in detail in Figs. 2 to 11 and comprises a casing 131 that is adapted to be mounted upon the floor or frame 55, Fig. 1, of the vehicle and has a chamber 132 in which a forked lever having a hub portion 133 and two spaced arms 134 is pivotally mounted on a shaft 135 supported by the casing 131. The arms 134 are separable for the purpose of assembly and are joined by a bolt 120 when assembled upon the shaft 135 and are provided with recesses 130 in which springs 136 are disposed for normally retaining the lever arms 134 in their upper position as indicated in dot and dash lines in Fig. 2. A valve operating finger 137 is fixed to the hub portion 133 of the rocking lever and is adapted to engage a valve stem 138 of a pilot valve device 139, to be hereinafter described. Stop lugs 100, Fig. 2, integral with the levers 134 engage the bottom wall of the casing 131 and limit the downward movement of the free ends of the levers 134 when the latter are depressed by pressure exerted by the operator's heel resting upon the pedal 42.

A foot actuated lever 141 is pivotally mounted in the chamber 132 between the rocking arms 134 by means of trunnion shafts 142 rotatably mounted in oppositely disposed bores 143 in the arms 134. The free end of the lever 141 is pivotally connected to a plunger or operating rod 144 by means of a pivot pin 145 and serves to impart reciprocating movement to the plunger 144 as the lever 141 is rocked upon the trunnion shafts 142, the plunger 144 being pivotally connected, as shown in Fig. 1, to a bell crank lever 129 that is pivotally mounted upon the frame 55 by means of a bracket 149. The free end of the bell-crank lever 129 is connected by means of a cable 150 to the operating lever 90 in such a manner that when the plunger 144 is depressed, the lever 90 is rotated in a clockwise direction, Figs. 1 and 13, toward application position. The spring 127 serves to return the operating lever 90 to release position when the plunger 144 is raised vertically to its upper position shown in Fig. 2.

The foot operated lever 141 is provided with a socket 146 for detachably receiving a cylindrical arm 147 that is integral with a bracket 148 to which the foot pedal 42 is attached, the pedal having a flange 151 for engaging and supporting the heel of an operator. The inner end of the arm 147 is provided with a transverse slot 152 for receiving a cross pin 153 carried by the lever 141 and extending across the socket 146 for the purpose of preventing rotary movement of the arm 147 within the socket. The foot pedal and bracket are made detachable so that the unit may be detached from the operating device 39 and inserted in the operating device 41 when it is desired to operate the vehicle from the opposite end thereof. The arm 147 of the bracket 148 is releasably retained within the socket by means of a manually operable latch lever 154 which is pivotally attached to the arm 147 by means of a pivot pin 155 and which is provided with a latch lug 156 that is adapted to engage within a bore 157 in the socket wall of the lever 141 and prevent withdrawal of the arm 147 from the lever. The latch bar 154 is yieldingly biased toward latching position by means of a spring 158 that is mounted in a recess 159 in the bracket 148, the outer end of the spring bearing against the lever 154 as shown in Fig. 2. In order to detach the foot pedal from the lever 141, the latch lever 154 is raised against the action of the spring 158 and the latch lug 156 is withdrawn from the bore 157. The foot pedal may then be withdrawn from the lever 141.

The pilot valve device 139 comprises a casing 161 and a casing 162 which are secured in assembled relation upon the casing 131 by means of screws 163. Within the casing sections 161 and 162 is a valve chamber 164 containing oppositely seating valves 165 and 166, the latter being yieldingly retained in closed position by means of a spring 167 that is disposed between the casing 162 and a spring seat disc 163a. The valve 166 is provided with a stem 138, which, as previously stated, is adapted to be engaged by the rocking finger 137.

The valve 165 is provided with a fluted stem 168 that is guided within a bore 169 in the casing 162 and which bore is connected to the main reservoir 21 through the pipe 59. Fluid under pressure supplied from the main reservoir through the pipe 59 and acting on the valve 165 holds it unseated so that when the valves 165 and 166 are in the normal position shown in Fig. 2, fluid under pressure flows from the main reservoir 21 to the safety control pipe 102, through pipe 59, bore 169, valve chamber 164 and passage 102. When the foot of the operator is removed from the foot pedal 42 and the lever arms 134 are forced to their uppermost position by the springs 136, the operating finger 137 forces the valve 166 to the left against the tension of the spring 167 and closes valve 165 and opens valve 166, thus cutting off the supply of fluid from the main reservoir to the safety control pipe and opening the safety control pipe to the atmosphere through valve chamber 164, past the open valve 166, bore 171 in which the fluted guide stem 138 is slidably mounted and chamber 132 which is open to the atmosphere through an opening 172 in the bottom wall 170 of the casing 131.

A manual hand operating device is provided for controlling the application of sand to the rails and the operation of the door engine, which device comprises the operating handle 43 which is mounted upon a rotatable shaft 174 at a convenient elevation for operation by the hand of the operator, the shaft being journaled for rotation in a flanged bushing 175 which is secured to a bracket 176, Fig. 7, attached at a suitable location upon the vehicle, the upper end of the shaft 174 having a square portion 177 which fits into a square opening 179 in a bushing 178 that is rotatably mounted in a bore 181 in the bushing 175.

The operating handle 43 is provided with a square projection 180 which fits into the opening 179 in bushing 178 so that it may be detached and inserted in the manual control device 41 when it is desired to operate the vehicle from the opposite end thereof.

The lower end of the rotatable shaft 174 is provided with a square portion 182 which extends into a square opening 183 provided in the hub 184 of a cam 185. The cam hub 184 is rotatably mounted in a bore 186 in the casing 131 and is retained in assembled position by means of a threaded nut 187 that is screwed upon the threaded end of the hub 184 as indicated in Fig. 7. By reason of the above described construction, the cam 185 is rotated by the operating handle 43, the degree of rotation being limited by means that will hereinafter be described.

The under face of the cam 185 is provided with a depending cam surface 188, Figs. 7 and 12, that is adapted to engage an anti-friction roller 190 rotatably mounted on the upper edge of a lever 189 that is pivotally mounted for oscillation upon a bracket 191 secured to the casing 131 by means of an attaching screw 192. The free end of the lever is provided with an anti-friction roller 193 which engages the upper end of the plunger 144 as indicated in Figs. 7 and 3. When the handle 43 is turned toward treadle door open or entrance and treadle door open position, Fig. 4, for effecting opening movement of the treadle doors or entrance doors, the cam face 188 depresses the lever 189, which in turn, depresses the plunger 144 for effecting an opening movement of the supply valve 62 of the brake valve device and the consequent delivery of fluid under pressure to the brake cylinder for retaining the brakes applied so long as any of said doors are open.

As indicated in Fig. 4, the operating handle 43 has four operating positions, namely, the normal position which is also the handle off position, sand position, treadle door open position and entrance and treadle door open position. When the operating handle is moved to the sand position, a lobe 195 on the cam 185 engages and moves the pivoted finger 196, Fig. 3, so that the latter engages and moves a fluted stem 197 of a sanding valve device 198 (Figure 9) to open position for effecting sanding of the rails.

The sanding valve device 198 comprises, as shown in Figs. 9 and 10, a casing section 199 that is attached to the casing section 131 and having a valve chamber 201, which communicates with a fluid supply chamber 202 through a passage 203 and which contains a sand controlling valve 204 which is normally held seated upon a valve seat 205 by means of a spring 206 that is interposed between the valve 204 and a closure cap 207 which serves to close the valve chamber 201. The sanding valve is fixed to the fluted stem 197 which is guided in a bore 209 in the casing 199 and which extends through a bore 211 in the casing 131 into the chamber 132 within the casing 131.

The fluid supply chamber 202 is always open to the sanding reservoir 23 through pipe and passage 212, Figs. 1 and 10, and when the valve 204 is moved to open position by reason of the engagement of the cam lobe 195 with the finger 196 and movement of the valve stem 197 by the finger 196, fluid under pressure flows from the sanding reservoir to the sand box 45, Fig. 1, at the front end of the car through pipe and passage 212, fluid supply chamber 202, passage 203, valve chamber 201, past the open valve 204, bore 209, chamber 213, passage and pipe 214 and pipe 215. As indicated in the diagram, Fig. 1, a check valve 216 prevents fluid from flowing through pipe 215 to the sand box 46 at the rear end of the car.

It will be understood that when fluid under pressure is supplied to the sand boxes 45 and 46, as the case may be, the sand is forced from the boxes onto the rails and that sand is discharged upon the rails so long as fluid is supplied to the sand box.

Means are provided in the casing 131 containing the cam 185 for limiting the turning movement of the cam 185 in a clockwise direction, Figs. 3 and 9, and for returning the cam and operating lever to the handle off position after the operator has moved it to sand position and after the operator has released his hold upon the handle. The limiting means comprises a plunger 200 having a spherical end portion 208 that is slidably mounted in a cylinder 210 in the bracket 191, the plunger being forced outwardly by a spring 173 so that the spherical end portion 208 of the plunger yieldingly engages the peripheral surface of the cam 185 and as a notch 160 in said face of the cam 185 registers with the portion 208, the spring 173 forces the portion 208 into the notch and causes it to releasably arrest movement of the cam in sand position. The returning means comprises a lug 221, Fig. 3, carried by the cam 185 which normally, when the operating handle is in handle off position, engages an arm 222 of a lever 223 that is pivotally connected to the casing 131 by a pivot pin 224. The free end of the lever 223 engages a spring 225 and compresses it when the lever is rotated in a counter-clockwise direction, Fig. 3, by the lug 221 as the cam is moved to sand position. The spring 225 overcomes the resistance offered by the plunger 200 and returns the lever to its normal position shown in Fig. 3 which in turn returns the cam 185 to the normal handle-off position when pressure exerted by the hand of the operator is relieved from the operating handle.

The front and rear treadle door engines 25 and 26 and the front and rear entrance door engines 27 and 28, Fig. 1, are controlled by the operating handle 43 through the medium of a door engine valve device 226 shown in Figs. 9 to 11 and partially in Fig. 3. The door engine valve device 226, Fig. 10, is mounted chiefly in the casing section 199 and comprises a pair of oppositely seating valves 227 and 228 for controlling the supply of fluid from the sanding reservoir to the treadle door engines 25 and 26 as the case may be. The valve 227 is mounted in the fluid supply chamber 202 and is adapted to be normally retained seated upon a seat 229 by a spring 231 interposed between the valve 227 and the closure cap 232, which is secured to the casing 199 and serves to close the fluid supply chamber 202. The valve 227 is provided with a fluted stem 233 guided within a bore 234 which opens into a central chamber 235 that is connected to the treadle door engine device by means of passage and pipe 236 and through a magnet valve device to be hereinafter described.

The valve 228 of the treadle door engine valve device is mounted within the chamber 132 which, as previously stated is open to the atmosphere through opening 172, Fig. 2. The valve 228 is provided with a fluted stem 237 which is guided in a bore 238, which is open to the central chamber 235, and the valve 228 is biased toward seated position upon a valve seat 239 by a spring 241 interposed between the valve and a closure cap 242 secured to the casing section 199. The valve 228 is normally held in open position, as shown in Fig. 10, by means of a lever 243, Figs. 3, 5, 7, 10 and 11, that is pivotally mounted for oscillation about a pivot pin 220 that is fixed to the casing 131. The lever is adapted to be engaged by the lobe 245 of the cam 185 and held in its valve open position as shown in Figs. 3 and 10 when the cam 185 and operating handle 43 are in the handle-off position. As indicated in Fig. 3, the lever 243 engages a flat portion on the cam lobe 245 when the cam is in handle-off position, and since the lever is yieldingly pressed into engagement with the lobe 245 by the spring 241, the cam is yieldingly retained in handle-off position.

The tension of the spring 241 is greater than that of the spring 231 and consequently when the operating handle 43 and cam 185 are turned to their treadle door open position or entrance and treadle door open position wherein the lobe 245 is moved out of engagement with the lever 243, the spring 241 forces the valve 228 to the left, closing valve 228 and opening valve 227, thus permitting fluid under pressure to flow from the fluid supply chamber 202 to the passage leading to the magnet valve device 35 for controlling the operation of the rear treadle door engine, past the open valve 227, bore 234, central passage 235 and passage and pipe 236. Communication from the passage 236 to the atmospheric chamber 132 is then closed by the valve 228.

It will here be understood that the manual control device 39 contains a treadle door valve device such as has just been described for controlling the rear treadle door engine 26 and that the manual control device 41 at the rear end of the car contains a similar treadle door valve device for controlling the treadle door engine 25 at the front end of the car. This is likewise true with respect to the entrance door engine valve device 244, that is, the treadle door engine valve device 244 of the manual control device 39 controls the flow of fluid to the front entrance door engine 27 and the entrance door engine valve device 244 in the manual control device 41 controls the supply of fluid to the rear entrance door engine 28.

The entrance door engine valve device 244 (Figure 10) comprises oppositely seating valves 230 and 240, the valve 230 being normally open and is disposed within the fluid supply chamber 202 and is biased toward closed position by means of a spring 246 interposed between the valve 230 and the closure cap 232, the valve having a fluted stem 247 that is guided in a bore 248 in the casing section 199, the bore opening into a central chamber 249. A passage and pipe 251 connects the central chamber 249 of the front control device 39 with the entrance door engine 27 to be hereinafter described.

The valve 240 is disposed in the atmospheric chamber 132 and is normally retained in seated position upon a valve seat 252 by a spring 253 that is disposed between an operating lever 255 and the closure cap 242. The lever 255 is similar to the lever 243 and is mounted on the pivot pin 220, the lever being attached to the valve 240 so that it moves the valve to open position when the lever is moved in a counter-clockwise direction, Fig. 3, by the lobe 195 of the cam 185 as when the cam is moved to entrance and treadle door open position. The valve 240 is fixed to a fluted valve stem 270 that is guided within a bore 280 in the casing 199 and when the valve 240 is seated, it cuts off communication from the passage and pipe 251 to the atmospheric chamber 132. As shown, the entrance door engine valve device 244 is in the door closed position wherein the valve 230 is open and the valve 240 is closed. With the valves in the door closed position shown, fluid under pressure flows from the fluid supply reservoir 202 through the pipe 251 to the left end of the entrance door engine 27 for retaining the door in closed position as will be hereinafter described. The value of the spring 253 is greater than that of the spring 246 and consequently when the lever 255 is disengaged from the lobe 195 of the cam 185 as shown in Figs. 3 and 10, the valve 240 is held in closed position and the valve 230 is held in open position against the tension of the spring 246 by reason of the engagement of the stem 270 of the valve 240 with the stem 247 of the valve 230.

By reference to Fig. 3 it will be noted that the cam lobes 245 and 195 are connected by a flat surface 250, which surface engages both levers 243 and 255 when the cam 185 is moved to treadle door open position. Movement of the cam 185 in either direction causes either the lobe 245 or 195 to engage its respective lever and consequently the cam is yieldingly held in treadle door open position by reason of the tension of the springs 241 and 253 acting on their respective levers 243 and 255. The operator is thus enabled to feel when the operating handle is in treadle door open position.

The cam 185 is arrested positively in entrance door open position by reason of the engagement of the shoulder 261, Fig. 3, of the upwardly extending portion of the cam lobe 245 with a depending portion 300, Figs. 5 and 7, of the top portion of the casing 131. Movement of the cam 185 from handle off position past said position is positively prevented by the lever 223, Fig. 3, when the lever has been moved so that the spring 225 is fully compressed by the lug 221 on the cam 185.

Referring to Figs. 7 and 8, it will be observed that the operating handle 43 is connected in driving relation to the operating shaft 174 through the medium of the bushing 178 and that removal of the bushing 178 and the rod 174 is prevented by a key pin 40 which extends through the bushing and over the upper square end 177 of the rod 174 and into an annular recess 30 in bushing 175. During assembly, after the rod 174, bushing 178 and supporting bushing 175 have been assembled, the bushing 175 which is finally fixed to the bracket 176, is turned so as to bring the holes 320 in the bushing 175 into registry with the holes 330 in the bushing 178. The pin 40 may then be inserted, after which operation, the bushing 175 is turned to its proper position upon the bracket 176 so that the attaching screw 340 may be inserted for fixing the bushing to the bracket 176. The holes 320 are so disposed that the pin 40 will not thereafter be brought into registry with the holes 320 during movement of the operating handle 173 and cam 185 between the extreme limits of its movement. Therefore the bushing 178 and rod 174 cannot be disassembled without first disconnecting the bushing 175 from the bracket 176 and turning it with respect to the bushing 178 so as to bring the pin 40 into registry with the holes 320.

The front and rear treadle door engines 25 and 26, respectively, are identical in construction and, as shown in Fig. 15, wherein the front entrance door engine 25 is shown in detail, comprise a casing 261 having oppositely disposed piston chambers 262 and 263 containing pistons 264 and 265, respectively, and a central chamber 266 containing a gear segment 267, fixed to a rotatable shaft 268, which is connected to the door operating mechanism, not shown. The pistons 264 and 265 are connected by a rod or stem 260 constituting a gear rack having teeth 347 which mesh with the teeth of the gear segment 267 and which rotate the gear segment 267 as the pistons move to their operative positions, the pistons being in the door closed position, as shown in Fig. 15. Also within the casing 261 is a piston chamber 269 containing a piston 271 and a valve chamber 272 containing a slide valve 273 that is adapted to be operated by a piston stem 274 connected to the piston 271. The piston 271 is biased toward the left position by a spring 275 disposed between the piston and the closure cap 276. The valve chamber 272 is always open to the sanding reservoir 23 through pipe 212 and the pressure of the fluid within the valve chamber 272 normally holds the piston 271 in its right-hand position against the action of the spring 275, in which position the cavity 277 in the slide valve connects the passage 278 in the casing 261 to atmospheric passage 279. Passage 278 opens into the piston chamber 263 and with the piston 271 in door closed position, fluid is vented from the piston chamber 263 to the atmosphere.

When fluid under pressure is supplied from the sanding reservoir 23 to the piston chamber 269 through a magnet valve device, to be hereinafter described, and through pipe and passage 281, the piston 271 is moved to the left position wherein the passage 282 which connects the piston chamber 262 with the valve chamber 272, is connected through the cavity 277 of the slide valve 273 to the atmospheric passage 279. With the valve 273 in the left position or door open position, passage 278 is uncovered by the slide valve and fluid under pressure flows from the valve chamber 272 to the piston chamber 263 through passage 278 and the fluid under pressure acting on the right face of the piston 265 forces the piston to the left or door open position, so that the gear segment 267 is rotated in a clockwise direction and causes opening movement of the door, not shown.

The magnet valve devices 34 and 35 are identical in construction and the magnet valve 34, Fig. 1, associated with the treadle door engine 25 comprises a casing 348 having valve chambers 283 and 284 containing valves 285 and 286, respectively, and an electro-magnet winding 287 for operating a core member 288 which constitutes a stem for the valve 286. The valve 285 is provided with a fluted stem 289 that is guided in a bore 291 which opens into a central chamber 292 that is open to the passage and pipe 281. The valve chamber 284 is open to the atmosphere through an atmospheric passage 349. The valve 286 is provided with a fluted stem 290, which is guided in a bore 293 in the casing 282 and which is open to the central chamber 292. A spring 294 contained in the valve chamber 283 engages the end of the valve 285 and normally retains it in the seated position shown, when the magnet winding 287 is deenergized. Fluid under pressure is supplied to the valve chamber 283 from the sanding reservoir through the treadle door engine valve device 226, Fig. 10, in the rear manual control device 41, Fig. 1, and through pipe 236ᵃ, past a ball check valve 295, which prevents a back flow of fluid from the valve chamber 283 into the pipe 236ᵃ.

The operating current for the electro-magnets 34 and 35 is supplied from a source of current such as battery 296, Fig. 1, and the circuit through the conductors 297 and through the windings 287 of the electro-magnets 34 and 35 by means of treadle switch devices 36 and 37, respectively. Means, not shown, are provided for normally yieldingly retaining the switch bars 298 and 299 of the treadle switch device out of contact with the contacts 301 so that the circuits through the electro-magnet devices 34 and 35 are normally open and the electro-magnet windings 287 deenergized.

The entrance door engines 27 and 28 are identical in construction and the front entrance door engine 27 shown in Fig. 16 comprises a casing 302 having a piston chamber 303 containing a piston 304 which carries a stem 305 that is provided at its end with a piston 306 of less diameter than that of the piston 304 and which is adapted to operate within a bore 307 which is open at one end to the atmosphere. The piston 306 carries an operating rod 308 which may be pivotally connected to operating mechanism for the entrance doors, not shown. The chamber 309 between the pistons 304 and 306 is always open to the sanding reservoir through passage and pipe 212. Fluid under pressure is normally supplied to the piston chamber 303, Fig. 16, from the sanding reservoir 23 and the fluid pressure chamber 202 which is always open to the sanding reservoir through pipe 212, past the normally open valve 230, bore 248, central chamber 249 and passage and pipe 251, and the fluid under pressure acting on the left face of piston 304 retains it in its right or door closed position shown in Fig. 16, against the opposing pressure of the fluid in the chamber 309 acting on the reduced area of the right face of the piston. When, however, the chamber 303 is open to atmosphere in a manner to be hereinafter described, the greater fluid pressure within the chamber 309 acting on the right face of the piston 304 causes the piston to move to the left or door open position and to open the entrance door, not shown.

The emergency sanding valve device 44 shown in Fig. 14 comprises a casing section 311, a pipe bracket section 312 and a filter section 313, the latter having screw-threaded connection to the casing 311 and serving to close a valve chamber 314 that is always open to the sanding reservoir 23 through passage and pipe 315 and which contains a valve 316 having a sealing seat 317 for making sealing engagement with a valve seat rib 318 surrounding a bore 319 that is open to a central chamber 321 in the casing 311. The central chamber 321 is connected to the sanding pipe 215 by means of a pipe 322 that is connected to the sanding pipe 215 at a point between the check valve 216 at the front end of the vehicle and the check valve 216ᵃ at a rear end thereof.

The valve 316 is provided with a bore 324 containing a needle valve plunger 325 which carries at its upper end a needle valve 326 that is adapted to engage a valve seat 327 and close communication from the valve chamber 314 to a screen chamber 328, which contains a screen 329 for filtering fluid supplied thereto from the main reservoir 21 through pipe and passage 59. The end of the screen chamber 328 is closed by means of a screw plug 331.

The needle valve plunger 325 is slidably mounted in the bore 324 for longitudinal movement therein and the movement thereof is limited by means of a pin 332 carried by the valve 316 and which extends through a slot 333 in the plunger. A spring 334 in the bore 324 serves to yieldingly retain the plunger in its outermost position so that when the valve 316 is moved from its seat, the needle valve 326 is yieldingly held in engagement with the valve seat 327 and permits of relative movement between the needle valve and the valve 316. The valve 316 is normally held seated upon the seat rib 318 by means of a spring 335 contained in the chamber 314 and disposed between the valve 316 and the filter casing 313.

The casing 311 also contains a valve chamber 336 containing a valve piston 337 having a sealing seat 338 adapted to engage an annular valve seat rib 339 surrounding a bore 341 in the casing 311 and adapted to a close communication from the chamber 336 to the central chamber 321. The valve piston 337 is provided with a stem 342 which extends through the bore 341 and into engagement with the stem 343 of the valve 316.

The lower face of the piston 337 is subject to the pressure of fluid within the chamber 344 in the casing 311, which chamber is normally open to atmosphere through passage and pipe 60 which leads to the brake valve device, chamber 105 and the atmospheric port 115 in the brake valve device casing 53, Fig. 13. The chamber 344 is always open to the atmosphere through passage 345 and a restricted passage 346 for a purpose to be hereinafter explained.

Under emergency operating conditions, as will hereinafter appear, fluid at brake cylinder pressure is supplied to the chamber 344 from the chamber 56 of the brake valve device and the fluid acting on the under face of the valve piston 337 forces it upwardly so that the valve stem 342 engages and moves the stem 343 of the valve 316 and causes the valve to be unseated and the needle valve 326 to be moved into closed position upon seat 327, thereby cutting off the supply of fluid from the main reservoir to the sanding reservoir in a manner and for a purpose to be hereinafter described.

The circuit breaker opening or "knock-out" devices 32 and 33, Fig. 1, are identical in construction and are for the purpose of moving the circuit breakers 29 and 31, respectively, to open position under emergency operating conditions and are adapted to be actuated, for opening the circuit breakers, by fluid under pressure when operating fluid is supplied to the sanding pipe 215 from the sanding reservoir 23 during an emergency operation. The knock-out device 32 for example, comprises a casing 351 having a chamber 352 containing a piston 354 adapted to reciprocate within the chamber 352 and which is provided with a restricted port 355 through which fluid under pressure may flow from the chamber 352 to the chamber 356 at the left side of the piston. The chamber 356 is open to the atmosphere through atmospheric ports 350. The piston is provided with a guide stem 357 which projects exteriorly of the casing 351 and which is provided with a knob 358 that is adapted to engage a trip lever 359 of the circuit breaker 29. The piston 354 is moved to the left by fluid under pressure supplied to the chamber 352 from the sand pipe 215 under emergency operating conditions against the action of a spring 361 disposed between the piston 354 and the end of the casing 351 and after a dead man's emergency brake application, and when the pressure in the chamber 352 is reduced sufficiently by reason of the blow down of fluid from the pipe 215 through the restricted port 355 and the atmospheric ports 350, the spring 361 forces the piston to the right or normal position shown in Fig. 1.

The check valve devices 47 and 48 are identical in construction, the latter being interposed between the interlock cylinder device 116 and the fluid supply pipes 281 and 281a which are associated with the treadle door engines 25 and 26, respectively, and comprises a casing 365 having a chamber 366 containing a double check valve piston 367 adapted to reciprocate within the chamber and alternately open and close ports 368 and 369 which open into an annular chamber 371 surrounding the chamber 366 and which is connected to the pipe 128 leading to the chamber 118 of the interlock cylinder device 116, Fig. 13. Pipe 281 is connected to the chamber 366 at the left side of the valve piston 367 and pipe 281a is open to chamber 366 at the right side of the valve piston 367. When fluid is supplied to pipe 281a, the fluid under pressure acting on the right face of the valve piston 367 forces it to the left position and fluid flows from the pipe 281a through the port 369, chamber 371 and pipe 128 to the chamber 118 of the interlock cylinder device 116. When fluid is supplied to the pipe 281, the fluid under pressure acting on the left face of the valve piston 367 forces it to the right position and fluid flows from the pipe 281 to the chamber 118 through port 368, chamber 371 and the pipe 128. The check valve piston 367 serves to prevent fluid from flowing from the pipe 281a to the pipe 281 and vice versa.

The double check valve device 47 is provided in the safety control pipe 102 intermediate the manual control devices 39 and 41 at opposite ends of the vehicle. When the valves 166 of said control devices at both ends of the vehicle are open, the safety control pipe is open at both control devices to atmosphere, but when an operator places his heel upon the foot pedal 42 at one end of the vehicle, the communication from the safety control pipe to atmosphere is closed at that end of the vehicle and communication from the main reservoir to the safety control pipe is opened at that end of the vehicle. The check valve device 47 prevents the flow of fluid from the charged portion of the safety control pipe to the atmosphere past the open valve 166 at the other end of the vehicle.

In operation, assuming that the parts of the apparatus are in release or running position wherein the entrance and treadle door engines are in door closed position, the brakes released, the treadle switches in the open circuit position, the supply of fluid under pressure to the sand boxes cut off, the circuit breaker knock-out devices in retracted position, that the treadle 42 and the operating lever 43 are attached to the manual control device 39 and that the operator's foot is upon the treadle so that the heel portion thereof is depressed as shown in Figs. 1 and 2, the push rod 144 then occupies its uppermost position as shown in Fig. 2 and the finger 137 of the manual control device is out of engagement with the stem 138 of the valve 166. With the parts in the position just described, fluid under pressure flows from the main reservoir to the safety control pipe 102 and the emergency piston chamber 101 of the emergency control device through pipe 59 past the open valve 165, valve chamber 164, thus charging the safety control pipe and the emergency piston chamber 101 with fluid at main reservoir pressure. The fluid under pressure acting on the emergency piston 103 retains it in its right or release position against the tension of the spring 108, in which position it will remain so long as the fluid pressure is maintained in the safety control pipe 102 and in chamber 101 and unless the fluid pressure in the safety control pipe is reduced in a manner to be hereinafter described.

Fluid under pressure also flows from the main reservoir 21 to the valve chamber 58 of the brake valve device through pipe and passage 59 as indicated in Fig. 13. Fluid under pressure also flows from the main reservoir 21 to the sanding reservoir 23 through pipe and passage 59, screen chamber 328 of the sanding valve device, Fig. 14, past the open needle valve 326, valve chamber 314 and passage and pipe 315, thus charging the sanding reservoir with fluid at main reservoir pressure.

With the parts of the apparatus in the above described position, as shown in Figs. 1, 2, 3, 4, 7, and 9 to 16, and with the vehicle in motion, a service application of the brakes is made by the operator depressing the toe portion of the foot pedal of the control device 39 as by pivoting his foot at the ankle and thereby moving the free end of the foot treadle or pedal 42 downwardly, thus causing the lever 141, Fig. 2, to be turned in a counter-clockwise direction about the center of trunnion shaft 143, and moving the plunger 144 downward, thus turning the bell crank lever 129 in a clockwise direction and causing it to pull the cable 150 toward the left. Pulling the cable 150 to the left turns the operating lever 90 of the brake valve device 38, Fig. 13, in a clockwise direction, so that the shaft 95 and the rocking lever 94 are also turned in a clockwise direction. The arm 96 of the lever 94 presses the plunger 86 toward the right carrying with it the pin 85 about which the levers 84 are pivoted. Since the spring 64 acting on one side of the supply valve 61, offers greater resistance to the inner movement of the levers 84 than does the spring 83 acting on the release valve 77, the supply valve 62 and rod 92, during the initial movement of the plunger 86 toward the right or application position, are maintained stationary, so that the pin 91 constitutes a stationary fulcrum for one end of the levers 84. As the plunger 86 and pin 85 are moved toward the right by action of plunger 144 and the intermediate mechanism, the levers 84 are caused to turn about the pin 91 in a clockwise direction and as the levers are thus moved, the roller 89 moving therewith causes the exhaust valve 77 to be seated against the opposing pressure of the spring 83, thus closing the atmospheric communication from the chamber 56 in the brake valve device through passage 76, valve chamber 75, passages 80, chamber 72 and passage and pipe 73 and consequently, from the brake cylinder 24 which is connected to the chamber 56 through pipe and passage 57.

When the release valve 77 is seated, the value of the spring 74 acting on the piston 69 being greater than the value of the spring 64 acting on the piston 62, the piston 69 will remain stationary, so that the pin 88 now becomes the fulcrum for the levers 84, so that as the plunger 144 is further depressed and causes further rotation of the lever arm 96 in a clockwise direction and further movement of the plunger 86 to the right, the rod 92 is moved to the right and causes the supply valve 62 to be unseated against the opposing pressure of the spring 64 and the fluid under pressure in the valve chamber 60¹, which pressure is equalized through a passage 70 in the valve 62, with the pressure of the fluid in chamber 58 supplied from the main reservoir through pipe and passage 59. With the valve 62 unseated, fluid under pressure flows to the brake cylinder 24 through pressure chamber 56 in the brake valve device and passage and pipe 57, thus effecting an application of the brakes.

When the pressure of fluid in pressure chamber 56 acting on the left side of the piston 69 has been increased to a degree slightly greater than the opposing pressure of the spring 74 acting on the right side of the piston, the piston will move towards the right. As the piston 69 is thus being moved, the action of the spring 64 causes the supply valve 62 to move towards its seat 63. Through the medium of the rod 92, the action of the valve 62 causes the levers 84 to turn about the pivot pin 85 in a clockwise direction, maintaining the exhaust valve 77 closed. When the supply valve 62 seats on the valve seat 63, the further flow of fluid under pressure from the main reservoir to the chamber 56 is closed off and the further inward movement of the piston 69 is stopped by the action of the spring 74. Since the piston 69 is brought to a stop at substantially the same time that the supply valve 62 seats, the spring 64, through the medium of the rod 92, pin 91, levers 84, pin 88, roller 89, and exhaust valve stem 79 will maintain the exhaust valve 77 seated. Thus the brake valve device is automatically operated to lap the supply valve while holding the exhaust valve closed.

If, when the several parts of the brake valve device have been moved to lap position as just described, it is desired to reduce brake cylinder pressure, the operator raises his toe so that the force exerted on the plunger 144 through lever 141, Fig. 2, is decreased, thus permitting spring 127 to act through lever 90, cable 150 and bell crank 129 to effect return upward movement of the plunger 144. The lever arm 96 is accordingly freed for rotation on shaft 95 in a counter-clockwise direction toward its normal release position by the return movement of plunger 86. The spring 83 acts to unseat the exhaust valve 77 and thus rock the levers 84 in a counter-clockwise direction about the pin 91, which is maintained stationary by the resistance offered by the spring 64 through the medium of the supply valve 62 and the rod 92, the plunger 86 being accordingly shifted back toward its normal position.

With the exhaust valve 77 thus unseated, the fluid under pressure is released from brake cylinder 24 to the atmosphere through pipe and passage 57, chamber 56 in the brake valve device, passage 76, exhaust valve chamber 75, past the open exhaust valve 77 in the piston 69, passages 80, spring chamber 72 and atmospheric passage and pipe 73. As the pressure of fluid in chamber 56 decreases, the spring 74 acts to move the piston 69 toward the left and, with the plunger 144 held stationary in the desired application position and the plunger 86 consequently held against movement towards the left, the exhaust valve 77 is maintained stationary and the piston 69 will move into seating engagement with the valve, thus closing off the further release of fluid under pressure from chamber 56 and consequently from the brake cylinders. This movement of the piston 69 relative to the exhaust valve 77 causes the spring 83 to be compressed.

With the valve 77 seated, the release of fluid under pressure from the brake cylinder 24 and pressure chamber 56 is closed off, and consequently the piston 69 will come to a stop without rocking the levers 84 to unseat the supply valve 62, thus the brake valve device is automatically lapped after the desired reduction in brake cylinder pressure has been effected.

To effect a complete release of the brakes, the toe of the operator is raised sufficiently to permit the spring 127 to return the operating lever 90 to full release position shown in Figs. 1 and 13, wherein its movement is arrested by engagement of the free end of the lever 141 with a lug 140 on the casing 131 which limits the upper movement of the plunger 144 to the release position shown in Fig. 2. As the rocking lever arm 96 is being turned in a counter-clockwise direction by the operating lever 90 to the release position, the action of the spring 83 causes the exhaust valve 77, carried by the piston 69, to be unseated as before described, permitting fluid under pressure to flow from the pressure chamber 56 and brake cylinder 24 to the atmosphere. As the pressure of fluid in chamber 56 reduces, the piston 69 is caused to move to the left by the action of the spring 74. The unseated exhaust valve 77 now moves forward with the piston, causing the levers 84 to rock in a counter-clockwise direction about the pin 91. Through the medium of the pin 85, this movement of the levers causes the plunger 86 to move longitudinally toward the left to the release position in which it is shown in Fig. 13, the rocking lever 94 being thus correspondingly returned in a counter-clockwise direction. Since the supply valve 62 is maintained seated and the exhaust valve unseated, the brake cylinder 24 is maintained open to atmosphere, and consequently the complete release of the brakes is effected.

It is apparent from the foregoing, that the degree of pressure of fluid supplied to the brake cylinder 24 depends upon the position of the operator's foot and the position of the plunger 86 and that when the operator's foot pedal 42 is fully depressed so as to move the plunger 86 to its extreme right position, as in effecting an application of the brakes with maximum force, the spring 74 acting on the valve piston 69 is so tensioned that the maximum pressure obtainable in the pressure chamber 56 from the main reservoir, is insufficient to move the piston valve further to the right to unseat the exhaust valve. Consequently, when the plunger 86 is in its extreme right position, the exhaust valve remains seated and the brake cylinder pressure builds up until it equalizes at about sixty-five pounds with that of the main reservoir.

The brake equipment is so designed that the vehicle may be safely brought to rest by moving the foot pedal to such position that a brake cylinder pressure of from fifteen to twenty-five pounds is obtained.

If it is desired to sand the rails when making a service application of the brakes, the operating handle 43 is turned from the handle off position shown in Fig. 4 to the sand position indicated in said figure, wherein the cam 185, Fig. 3, is so turned in a clockwise direction that the lobe 195 thereof moves the pivoted finger 196 to the left, thereby moving the sanding valve plunger or stem 197 to open position wherein the valve 204, Fig. 9, is unseated. With the valve 204 unseated, fluid under pressure flows from the sanding reservoir 23 to the sand box 45 at the front end of the vehicle through pipe and passage 212, Figs. 1 and 9, supply chamber 202 in the casing 199, passage 203, valve chamber 201, past the open valve 204, bore 209, chamber 213, passage and pipe 214 and pipe 215. The check valve 216 in the pipe 215 prevents fluid under pressure from flowing from the pipe 214 and pipe 215 to the sand box 46 at the rear end of the vehicle. When sufficient sand has been applied to the rails for the purpose of assisting in bringing the vehicle to rest, the operator may release his hold upon the operating handle 43, thus permitting the spring 225 to turn the lever 223 in a clockwise direction so that the arm 222 of the lever engages the lug 221 on the cam 185 and causes it to turn in a counter-clockwise direction, Fig. 3, to its handle off position, as shown in Figs. 1, 3 and 4.

The cam 185 which is connected through shaft 174 to the operating handle 43 is provided on its under face as shown in Figs. 7 and 12 with a cam surface 188 which is adapted to engage the roller 190 carried by the lever 189 and to depress the lever 189 so as to cause plunger 144 to move downwardly and thereby effect movement of the plunger 86 and opening movement of the supply valve 62 as the cam is rotated to treadle door open position or to entrance and treadle door open position. This operation insures a supply of fluid under pressure to the brake cylinder sufficient to maintain the brakes applied while the door engines are in open position and in the event that the pressure applied by the operator to the foot pedal is relieved while the doors, not shown, are in open position. The provision of the cam on the door operating handle 43 also assures stopping of the vehicle in the event that the operator has not pressed the toe of his foot down a sufficient distance to effect proper service application of the brakes.

Assuming that the vehicle has been brought to rest by reason of the service application of the brakes through operation of the foot pedal and in the manner above described, and it is desired to cause the treadle or exit door to open to permit exit of a passenger, the operator moves the operating lever 43 to the treadle door open position, Fig. 4, thereby rotating the cam 185 in a counter-clockwise direction, Fig. 3, so that the cam lobe 245 moves out of engagement with the lever 243 and permits the spring 241, Fig. 10, to seat the valve 228 and unseat or open the valve 227 against the action of the spring 231. With the valve 228 seated and the valve 227 unseated, fluid under pressure flows from the sanding reservoir 23 to the valve chamber 283 of the magnet valve device 35, Fig. 1, through pipe and passage 212, supply chamber 202 of the control device 39, Fig. 10, past the open valve 227, bore 234, central chamber 235, passage and pipe 236 and past the ball check valve 295. When the outgoing passenger treads upon the treadle switch bar 299 of the rear switch device 37 which is located in front of the rear treadle or exit door, the circuit through the magnet valve device 35, winding 287 thereof and the source of electric current 296 is closed by reason of contact of the treadle switch bar 299 with the contacts 301. Energization of the magnet winding 287 causes the valve 286 to be seated and the valve 285 to be unseated against the action of the spring 294. With the valve 286 seated and the valve 285 unseated, communication from the central chamber 292 to the atmosphere through exhaust port 349 is cut off and fluid under pressure then flows from the valve chamber 283 past the open valve 285, central chamber 292 and passage and pipe 281ª to the piston chamber 269 of the treadle door engine 26.

For further explanation of the operation of the treadle engine 26 reference is made to Fig. 15 which discloses in detail the construction of the treadle door engine 25 which is identical to the treadle door engine 26. The pressure of the fluid supplied to the piston chamber 269 through the pipe and passage 281ª combined with the pressure of the spring 275, moves the piston 271 to the left position against the pressure of the fluid in the valve chamber 272 supplied thereto from the sanding reservoir through pipe 212, thereby moving the slide valve 273 to the door open position wherein the cavity 277 in the slide valve connects the passage 282 with the atmospheric passage 279 and thus venting fluid under pressure from the piston chamber 262 containing the door engine operating piston 264. With the slide valve 273 in the above door open position, the passage 278 is uncovered by the slide valve and fluid under pressure flows from the valve chamber 272 to the piston chamber 263 at the right side of the door operating engine piston 265, and the fluid pressure acting on the right face of the piston 265 moves the piston and gear rack rod 260 to the left or door open position, thus turning the gear segment 267 in a clockwise direction and turning the shaft 268 so as to open the door, not shown.

Upon the unseating of the magnet valve 285 as the result of a passenger standing or treading upon the treadle switch bar 299, fluid under pressure is also supplied from the valve chamber 283 of the magnet valve device 35 to the piston chamber 118 of the interlock cylinder 116, Fig. 13, and Fig. 1, past the open valve 285, central chamber 292, passage and pipe 281ª, chamber 366 of the double check valve 48, port 369, annular chamber 371 and passage and pipe 128. It will be understood that when fluid under pressure is supplied to the pipe 281ª the pressure of the fluid within the chamber 366 acting on the right face of the valve piston 367 forces the valve piston to the left position shown in Fig. 1 and permits the fluid to flow to the piston chamber 118 as described.

The fluid under pressure within the chamber 118 acting on the left face of the piston 119, Fig. 13, maintains the piston and the swivel plunger rod 124 in a locking position which serves to prevent movement of the operating lever 90 of the brake valve device to release position. It is apparent from the foregoing that so long as the departing passenger stands upon the foot treadle bar switch 299 and maintains the circuit through the magnet valve winding 287 closed, and the magnet valve 285 open, fluid under pressure will be supplied to the piston chamber 118 and prevent release of the brakes. The provision of this interlocking mechanism prevents release of the brakes and movement of the car so long as the treadle door is in open position.

When the passenger steps from the treadle switch bar 299, the circuit through the electro-magnet winding 287 is interrupted and deenergization of the electro-magnet permits the spring 294 to seat the valve 285 and unseat the exhaust valve 286. Fluid under pressure is then vented from the piston chamber 118 of the interlock cylinder device 119 to atmosphere through pipe 128, annular chamber 371, port 369, chamber 366 in the check valve device 48, pipe and passage 281ª, central chamber 292 of the magnet valve device 35, past the open valve 286 and through the atmospheric passage 349. Fluid under pressure is also exhausted from the piston chamber 269 of the treadle door engine device 26 to the atmosphere through pipe 281ª and to the atmosphere through atmospheric port 349 in the manner just described. With the pressure in the chamber 269 of the treadle door engine device reduced to atmospheric pressure, the greater pressure in the valve chamber 272 supplied thereto from the sanding reservoir 23 and acting on the left face of the piston 271, moves the latter to the right or door closed position wherein the cavity 277 in the slide valve 273 again connects the piston chamber 263 and passage 278 with the atmospheric passage 279, thus establishing communication from the piston chamber 263 to the atmosphere. With the piston 271 and slide valve 273 in the door closed position, the passage 282 is uncovered by the slide valve and fluid under pressure flows from the valve chamber 272 which is constantly in communication with the sanding reservoir through pipe 212, to the piston chamber 262, and the fluid acting on the left face of the piston 264 forces the piston to the right or door closed position. As the piston 264 and the gear rack rod 260 move to door closed position, the gear segment 267 is turned in a counter-clockwise direction and causes the door operating shaft 268 to close the door, not shown.

Since the piston chamber 118 of the interlock cylinder device 119 is at this time open to the atmosphere, the spring 127 may move the operating lever 90 of the brake valve device 38 to the release position shown in Fig. 13, when the operator raises the toe of his foot to permit of the upward movement of the plunger 144 to the release position shown in Fig. 2. Movement of the operating lever 90 to release position by the spring 127 causes movement of the lever arm 96 of the brake valve device to release position and permits of movement of the plunger 86 to release position in the manner heretofore described for effecting release of the brakes.

If, when the car has been brought to rest and the operator desires to cause opening of the entrance door to permit entrance of a passenger, the operating handle 43 is moved to entrance and treadle door open position indicated by a dot and dash line in Fig. 4. When the operating handle is moved to entrance and treadle door open position, the lobe 195 of the cam 185, Fig. 3, engages the lever 255, Figs. 3, 5, 7 to 11, and moves it outwardly against the action of the spring 253, thereby unseating the valve 240 and permitting the spring 246 to seat the open valve 230. It will be understood that the lobe 245 of the cam 185 remains out of contact with the lever 243 in both treadle door open position and entrance and treadle door open position and that in moving the operating handle from handle off position to entrance and treadle door open position the opening movement of both the treadle door and the front entrance door is effected, the opening of the treadle door being effected as previously described and the opening of the front entrance door is effected in the following manner.

With the supply valve 230 seated and the exhaust valve 240 unseated, as when the operating handle is in entrance and treadle door open position, the piston chamber 303 of the front door engine device 27 is open to atmosphere through pipe 251, Figs. 16 and 10, central chamber 249, bore 280, past the open valve 240 and atmospheric chamber 132. With the piston chamber 303 open to the atmosphere, the higher pressure of the fluid acting on the right face of the piston 304 moves the piston to the left or open position, carrying with it the operating rod 308 which is connected to the door operating mechanism, not shown.

As previously shown, when the operating handle 43 is in either treadle door open position or entrance and treadle door open position, the cam 188 on the under face of the cam 185 depresses the lever 189, thereby depressing the operating plunger 144 so that the plunger 86 of the brake valve device is moved sufficiently to produce a brake cylinder pressure of from 15 to 20 pounds and a service application of the brakes, the said brake cylinder pressure being sufficient to bring the car to rest under ordinary operating conditions.

It is, therefore, apparent that the brakes will be held applied through the medium of the hand operated cam 185 even though the operator raises the toe of his foot and permits the foot pedal 42 to assume its upper release position, as shown in Fig. 2. It is also apparent that the brakes may not be released by hand operation without effecting closing movement of the entrance and treadle door, for when the operating handle is moved to the handle off position, the lobe 245 of the cam 185 moves the lever 243 outwardly for effecting closing movement of the treadle door engine as hereinbefore described, and the lobe 195 of the cam 185 is moved out of engagement with the lever 255 which permits the spring 253 to move the exhaust valve 240 to closed position and to unseat the supply valve 230. With the exhaust valve 240 seated and the supply valve 230 unseated, fluid under pressure flows from the sanding reservoir to the cylinder 303 of the front entrance door engine 27 through pipe and passage 212, fluid supply chamber 202, past the open supply valve 230, bore 248, central chamber 249, and passage and pipe 251. Since the area of the left face of the piston 304 is greater than the effective area of the right face of the piston exposed to the fluid pressure within the chamber 309, the greater force acting on the left face of the piston moves the piston to the right or door closed position, as shown in Fig. 16, thereby causing closing movement of the front entrance door through the medium of the operating rod 308 which is connected to the sealing piston 306 and the piston stem 305.

As previously described, an application of the brakes with maximum force may be obtained by depressing the foot pedal 42 to its extreme lowermost position wherein fluid at main reservoir pressure is supplied to the brake cylinder. Under such application of the brakes, sand may be applied to the rails from the front sand box by operating the hand lever 43 to sand position.

Dead man's emergency features are provided in the control equipment for effecting an emergency application of the brakes in the event that the operator becomes incapacitated and removes his foot from the foot pedal. Under dead man's emergency operating conditions an emergency application of the brakes is effected, sand is automatically supplied to the rails from the sand boxes at the front and rear cars of the train, the circuit breakers for controlling the electric current supply to the motors are moved to open position for cutting off the supply of power to the driving motors and finally the fluid pressure acting on the door engines for the entrance and treadle doors are so balanced that the doors may be manually moved to open position by the passengers should it become necessary.

Under dead man's emergency operating conditions, should the operator become incapacitated and remove his foot from the foot pedal 42, removal of the pressure applied to the pedal by the operator's foot permits the spring 136, Fig. 2, to move the lever arms 134 of the manual control device 39 upwardly or in a counter-clockwise direction about the pivot shaft 135, thereby moving the operating lever in a counter-clockwise direction so that the finger 137 engages the stem 138 of the valve 166 and moves it to the left, unseating the valve 166 and seating the valve 165. Seating of the valve 165 cuts off the supply of fluid from the main reservoir to the safety control pipe 102 and the unseating of the valve 166 opens the safety control passage and pipe 102 to atmosphere through valve chamber 164, past the open valve 166, bore 171 and atmospheric chamber 132.

Upon opening of the safety control pipe 102 to atmosphere, the fluid under pressure in the emergency piston chamber 101 is vented to atmosphere through the pipe 102 and the reduction in fluid pressure in the chamber 101 permits the spring 108 to move the stem 107 and piston 103 to the left or emergency position. As the stem 107 moves toward emergency position, the block 113 carried thereby engages the arm 97 of the lever 94 of the brake valve device and moves it in a clockwise direction so that the lever arm 96 moves the plunger 86 to its extreme right position wherein, as has been previously described, fluid under pressure flows from the main reservoir to the brake cylinder until the brake cylinder pressure has been increased to the full main reservoir pressure. An emergency application of the brakes is thus effected.

With the emergency piston 103 in emergency position, the piston 106 is moved to a position between the passage 60 and the atmospheric passage 115 so that communication from the passage 60 to the atmosphere is cut off and communication is established from the chamber 56 of the brake valve device to the chamber 344 beneath the piston 337 of the automatic sanding valve device 44, Fig. 14, through passage 98 in the casing 51 of the brake valve device 38, chamber 99 of the emergency piston device, bore 105, and passage and pipe 60, Figs. 1, 13 and 14. The fluid at brake cylinder pressure acting on the under face of the piston 337 moves the piston and the valve 316 upwardly against the action of the spring 335, thus unseating the valve 316 and closing the needle valve 326. With the needle valve 326 closed, communication from the main reservoir to the sanding reservoir 23 is cut off and communication is established from the sanding reservoir to the sand box 45 through pipe 315, valve chamber 314, past the open valve 316, bore 319, valve chamber 321, passage and pipe 322, pipe 215, past the check valve 216. Fluid under pressure from the sand reservoir also flows from the pipe 215 to the rear sand box 46 past the check valve 216ª. It is apparent, therefore, that under dead man's emergency operating conditions, sand is automatically supplied to the rails, not shown, from the front and rear sand boxes 45 and 46.

At the same time that fluid under pressure is supplied from the sanding reservoir 23 to the sand boxes 45 and 46 through pipe 215, fluid under pressure is supplied from the sanding reservoir and the pipe 215 to the piston chamber 352, Fig. 1, of the circuit breaker opening or the knock-out devices 32 and 33 and the fluid under pressure acting on the faces of the pistons 354 moves them against the action of the springs 361 and forces their plungers 357 outwardly so that the knobs 358 on the ends thereof engage the operating handle 359 of the circuit breakers or line switches 29 and 31 and moves them to circuit open position. Thus, under dead man's emergency operating conditions the power supplied to the vehicle motors is automatically cut off.

When the pistons 354 of the knock-out devices are moved to their circuit breaker open position, communication is established from the pipe 215 to the atmosphere through the ports 350 which are uncovered by the piston 354. The fluid within the sanding reservoir therefore blows down to the atmosphere through passage and pipe 315, valve chamber 314, past the open valve 316, bore 319, chamber 321, passage and pipe 322, pipe 215, piston chamber 352 of the knock-out device, passages 355, chamber 356, and ports 350. When the pressure of the fluid in the sanding reservoir and the piston chamber 352 of the knock-out device has reduced sufficiently, the spring 361 returns the piston 354 to its normal position, but fluid under pressure continues to flow from the sanding reservoir through the restricted passage 355 in the piston 354 and the atmospheric port 350.

Since the valve chambers 272 of the treadle door engine devices 25 and 26, Figs. 1 and 15, are always open to the sanding reservoir through pipe 212, the pressure of the fluid within the valve chamber 272 of such devices is reduced to atmosphere with that of the sanding reservoir and permits the spring 275 to move the valve to its left position. Since the piston chambers 263 were previously open to the atmosphere through passage 278, cavity 277 and atmospheric port 279, and since the piston chamber 262 is, after the valve 273 has moved to its left position, connected to atmosphere through passage 282, cavity 277 in the slide valve 273 and atmospheric port 279, the fluid pressures acting on the outer faces of the pistons 265 and 264 are balanced so that the pistons may be moved by the treadle door operating apparatus, thus permitting manual opening of the treadle doors, not shown, by a passenger.

Since the chamber 309 of the entrance door engine device is always open to the sanding reservoir, under the dead man's emergency operating conditions just described, the pressure of the fluid within the chamber 309 falls to atmospheric pressure with that of the sanding reservoir. Since the sanding reservoir is connected to the supply chamber 202 of the manual control devices 39 and 41 through the pipe 212 and since the supply valves 230 are normally open, the pressure of fluid in the piston chambers 303 of the entrance door engine devices is reduced to the atmospheric pressure in the sanding reservoir by flow of fluid through pipe 251, chamber 249, bore 248 and past open valve 230, thus balancing the pressures on the pistons 304 and 306 so that the pistons may move in response to movement of the door operating mechanism, not shown, and connections thereto and permit of manual operation of the entrance doors, not shown, by the passengers of the vehicle in order to gain exit from the car.

From the foregoing, it is apparent that under dead man's emergency operating conditions an emergency application of the brakes is effected, sand is supplied to the rails from both the front and rear sand boxes, the power is shut off from the motors of the vehicle and the door engines are balanced so as to permit of opening movement thereof by the passengers within the vehicle. Since sand flows from the sand boxes only when fluid is supplied to the sand boxes from the sanding reservoir, the flow of sand is discontinued when the fluid under pressure in the sanding reservoir has been exhausted to atmosphere.

The flow capacity of the atmospheric ports 350 in the knock-out device and the flow capacity of the restricted passages 355 in the piston of the knock-out device may be so proportioned that sufficient pressure is maintained in the sanding reservoir to prevent operation of the door engine by hand for opening the doors until sufficient time has elapsed for the brakes to arrest movement of the vehicle, thus insuring that the doors cannot be opened until the car has been brought to rest.

In order that the operator may remove his foot from the foot pedal to attend to other duties such as the observation of clearances when passing vehicles parked near the railway on which the vehicle is traveling, without effecting an emergency application of the brakes as hereinbefore described, provision is made for permitting the removal of the operator's foot from the foot pedal, but only after a service application of the brakes has been effected by supplying fluid at twenty-five pounds pressure at least to the brake cylinders. When the toe of the operator has been depressed sufficiently to move the foot pedal so that the plunger 86 of the brake valve device is moved to effect a flow of fluid from the main reservoir to the brake cylinders which builds up to at least twenty-five pounds pressure for example, the necessary rotation of the lever 96 to obtain such results causes the locking bar 217, Fig. 13, to be moved into the notch 110 of the block 113 carried by the emergency piston stem 107. With the brake valve device in position to produce a brake cylinder pressure of twenty-five pounds, and with the lock bar within the notch 110, the operator may lift his foot from the brake pedal without effecting an emergency application of the brakes because the lock bar 217 will engage the inclined face 257 of the notch 110 and prevent spring 108 from moving the piston 106 and the piston 103 to emergency position even though the pressure in the chamber 101 has been reduced to atmospheric pressure by opening of the valve 166, Fig. 2, upon removal of the operator's foot. The passage 60 will then remain open to the atmosphere as before and the sanding valve piston 337 will remain in its normal position, as shown in Fig. 14.

Since the inclined face 256 on the locking bar 217 is held under pressure imposed by the spring 108 in engagement with the inclined face 257 of the wall of the notch 110, the locking bar 217 is yieldingly retained in locking position and retains the rocking lever arm 96 and the plunger 86 in the position to which they were moved in making the service application of the brakes. The brakes will therefore remain applied until the operator's heel is again placed upon the foot pedal 42 so as to move the operating finger 137 out of engagement with valve stem 138 and permit opening movement of the valve 165 by the spring 167 so that fluid may be again supplied from the main reservoir to the safety control pipe 102. Restoration of main reservoir pressure in the piston chamber 101 by the flow of fluid from the main reservoir through pipe 59, past open valve 165 and passage and pipe 102, effects movement of the piston 103 to the right, thereby releasing engagement of the inclined surface 257 from the inclined surface 256 of the locking bar 217. The rocking arm 96 may then return to its normal position in the event that the toe of the operator's foot is raised so as to permit the foot pedal to return to the position shown in Fig. 2.

Summarizing, safety control apparatus is provided for a fluid pressure brake system that is supplied from a main reservoir with fluid under pressure controlled by a brake valve device of the self-lapping type. The equipment includes a sanding reservoir, front and rear sand boxes, front and rear entrance doors and door engines, front and rear treadle or exit doors and treadle door engines, circuit breakers or line switches and circuit breaker opening or knock-out devices for effecting opening of the circuit breakers or line switches under dead man's emergency operating condition. The operation of the equipment is controlled by a manually controlled device, by means of which the equipment may be controlled through the medium of a foot pedal or a hand operated lever, the hand lever serving to effect opening and closing movement of the entrance and treadle door engines, the discharge of sand from the front sand box of the vehicle, and maintenance of the brakes applied so long as the door engines are in open position.

The equipment is controlled by fluid under pressure supplied to a safety control pipe which is supplied with fluid under pressure from the main reservoir so long as the heel of the operator's foot depresses the heel end of the foot pedal. Service applications of the brakes may be effected by moving the toe of the operator downward, thereby depressing the toe end of the foot pedal for obtaining any desired brake cylinder pressure up to maximum pressure during a service application of the brakes. Removal of the foot of the operator from the foot pedal and permitting the heel portion of the foot pedal to return to its normal position effects a dead man's emergency application of the brakes.

The sand boxes, door engines, and knock-out devices are actuated by fluid under pressure supplied from a sanding reservoir. A sanding valve actuated by the hand operated lever controls the supply of fluid under pressure from the sanding reservoir to the front sand box and an automatic sanding valve is actuated under dead man's emergency operating conditions to automatically effect delivery of operating fluid to the front and rear sand boxes under dead man's emergency brake operating conditions.

Upon removal of the operator's foot from the foot pedal, the safety control pipe is opened to atmosphere and an emergency piston associated with the brake valve device moves to supply fluid at brake cylinder pressure to the automatic sanding valve device, causing the latter to operate to supply fluid under pressure from the sanding reservoir to the door engine device, the front and rear sand boxes, and the front and rear circuit breaker knock-out devices. Upon operation of the knock-out devices, the sanding reservoir is opened to atmosphere, thereby reducing the fluid pressure supplied to the door engines from the sanding reservoir and balancing the pressure on the operating piston thereof so that the door may be manually opened by the passengers.

Since the discharge of sand from the sand boxes is dependent upon a flow of fluid from the sanding reservoir to the sand boxes, the flow of sand is limited to the quantity of fluid under pressure supplied to the sand boxes from the sanding reservoir while the latter is blowing down to atmosphere.

Interlocking mechanism is provided for preventing opening movement of the treadle door except when a passenger is standing upon a treadle in front of the door, and interlocking means is also provided for preventing release of the brakes so long as a passenger is standing upon the treadle and the door is open.

Interlocking mechanism is also provided so that after a service application of the brakes has been made with fluid supplied to the brake cylinder at a predetermined pressure, (for example twenty-five pounds) the operator may remove his foot from the pedal to attend to other duties without effecting a dead man's emergency brake application.

It is apparent from the foregoing that a simple and effective safety car control mechanism is provided wherein safe operation of the apparatus in proper sequence is assured so that passengers are protected from injury and wherein the vehicle may be automatically brought to rest and the doors placed in condition for opening by the passengers in the event of incapacitation of the operator.

Other safety car equipments similar to that described herein are shown and claimed in my copending application, Serial No. 698,243, filed on the same day as is this application, and in the copending application of Ellis E. Hewitt, Serial No. 19,378, filed on May 2, 1935, both applications being assigned to the assignee of this application.

While but one embodiment of the invention is herein disclosed, it is obvious that additions, omissions and other changes may be made in the structure disclosed without departing from the spirit of the invention.

Having now described my invention, what I claim as new and desire to secure by Letters Patent, is:

1. In a fluid pressure brake, the combination with a brake valve device operable to effect an application of the brakes and a manually operated pedal mechanically connected to said brake valve device for operating said brake valve device upon depression of the pedal, of fluid pressure responsive means operated upon a reduction in fluid pressure for also effecting the operation of said brake valve device, valve means operated upon release of said pedal for effecting a reduction in pressure on said fluid pressure responsive means, and means operative, upon manually operating said brake valve device to effect an application of the brakes, for preventing the operation of said fluid pressure responsive means by a reduction in fluid pressure.

2. In a fluid pressure brake, the combination with a brake valve device operable to effect an application of the brakes and manually operable means for operating said brake valve device, of a fluid pressure operated means normally subject to fluid under pressure and operated by a variation in fluid pressure for also operating said brake valve device to effect an application of the brakes, and valve means for normally supplying fluid under pressure to said fluid pressure operated means and operated upon release of said manually operated means by an operator for varying the fluid pressure on said fluid pressure operated means.

3. In a safety car control equipment, the combination with a source of fluid under pressure, a pair of fluid pressure actuated sand boxes, and a conduit connecting said boxes, of a pair of check valves disposed in said conduit and dividing the conduit into an intermediate section and two other sections leading respectively to said boxes, and operable simultaneously to permit flow of fluid from the intermediate section to both the other sections, but preventing back flow from said other sections to the intermediate section, an automatically operated valve for supplying fluid under pressure from said source to said intermediate section and thence past said check valves to both sand boxes, and two separate manually operable valves for supplying fluid under pressure to each of the other sections, respectively.

4. In a fluid pressure brake, the combination with an operating device, a brake valve device manually movable to application position by said operating device for effecting an application of the brakes, of a movable abutment for actuating the said brake valve device adapted to be yieldingly urged to application position for effecting movement of the brake valve device to application position and to be moved to its release position by fluid pressure acting thereon, a valve means for controlling the supply of fluid under pressure acting on said abutment, said valve means being adapted to be operated by said operating device, and means actuated by said operating device for locking said abutment against movement when the brake valve device is in a predetermined operative position.

5. In a fluid pressure brake, the combination with an operating device, a brake valve device manually movable to release position and application position by said device, the said device having a manually operable means adapted to be yieldingly urged into application position and adapted to be held in a release position by pressure manually applied by an operator, of a fluid pressure actuated means having release and application positions and adapted when supplied with fluid under pressure to be held in release position and adapted to actuate the brake valve device to application position upon a reduction of the pressure of the fluid acting on said means, valve means actuated by said manually operable means adapted when the manually operable means is in release position to supply fluid under pressure to said fluid pressure actuated means.

6. In a safety car control equipment, the combination with a fluid pressure actuated door engine, and a source of fluid under pressure, of a manually operable valve device, and an electric current responsive valve device, said valve devices being effective jointly to control the supply of fluid under pressure from said source to said door engine.

7. In a safety car control equipment, the combination with a fluid pressure actuated door engine, and a source of fluid under pressure, of a conduit providing communication through which fluid under pressure may be supplied from said source to said door engine, a manually operable valve device for controlling the flow of fluid under pressure through said conduit at one point therein, an electric current responsive valve device for controlling the flow of fluid under pressure through said conduit at another point therein, and a manually operable switch device for controlling the supply of current to said current responsive valve device.

8. In a safety car control equipment, a source of fluid under pressure, a pair of fluid pressure actuated sand boxes, a manually operable valve for controlling the supply of fluid under pressure from said source to one of said sand boxes, a fluid pressure responsive valve device for controlling the supply of fluid under pressure to both of said sand boxes, and a pair of check valve devices adapted to operate simultaneously to permit fluid under pressure to be supplied to both of said sand boxes under the control of said fluid pressure responsive valve device.

9. In a safety car control equipment, the combination with a fluid pressure brake, a brake valve device, a safety control pipe, a fluid pressure controlled actuating means for said brake valve device controlled by fluid under pressure supplied from said safety control pipe, a source of fluid under pressure, two separate manually operated control valves adapted when in release position to establish communication from said source to said safety control pipe and when in application position to establish communication from said safety control pipe to the atmosphere, the said valves being biased toward application position and held in release position by manually applied force, of check valve means in said safety control pipe for preventing fluid which is flowing to the safety control pipe from said source past one control valve when that control valve is in release position, from flowing to the atmosphere through the other control valve while that valve is in application position.

10. In a safety car control equipment, a source of fluid under pressure, a pair of sand boxes, fluid pressure controlled valve means for controlling the supply of fluid under pressure from said source to both of said sand boxes, two manually operated valve means each separately operable to control the supply of fluid under pressure to a different one of said sand boxes, and check valve means for preventing fluid supplied through one of said manually operated valve means to one of said sand boxes from flowing to the other of said sand boxes and adapted to permit fluid under the control of said fluid pressure controlled means to be supplied simultaneously to both of said sand boxes.

11. In a fluid pressure brake, the combination with a brake valve device operative to effect the operation of the brakes, of a manually operated means mechanically connected to said brake valve device and adapted upon pressure being applied thereto to effect movement of said brake valve device to a brake application position, fluid pressure responsive means operative upon a variation in fluid pressure to also effect movement of said brake valve device to a brake application position, said manually operated means being adapted to also control the variation in fluid pressure to cause operation of said fluid pressure responsive means.

12. In a fluid pressure brake, the combination with a brake valve device operative to effect the operation of the brakes, of a lever supported for rocking movement and bodily movement thereof, means for mechanically transmitting the rocking movement of said lever to said brake valve device for moving it to a brake application position, fluid pressure responsive means operative to effect movement of said brake valve device to a brake application position, the operation of said fluid pressure responsive means being controlled by bodily movement of said lever.

13. In a fluid pressure brake, the combination with a brake valve device operative to effect the operation of the brakes, of a lever supported for pivotal movement at two different points, means for mechanically transmitting the movement of the lever, when pivoted at one point, to said brake valve device for moving it to a brake application position, fluid pressure responsive means also operative to effect movement of said brake valve device to a brake application position, the operation of said fluid pressure responsive means being controlled by movement of said lever when pivoted at the other of said points.

14. In a fluid pressure brake, the combination with a brake valve device operative to effect the operation of the brakes, of a lever supported for pivotal movement at two different points, means for mechanically transmitting the movement of the lever, when pivoted at one point, to said brake valve device for moving it to a brake application position, fluid pressure responsive means also operative to effect movement of said brake valve device to a brake application position, valve means for controlling the fluid pressure acting on said fluid pressure responsive device, said valve means being operated upon movement of said lever when pivoted at the other of said points.

15. The combination with a brake controlling valve device and a door engine, of an element operatively movable to effect operation of said valve device, manually operative means for moving only said element, means operative to control the said door engine, and a second manually operative means effective to cause operative movement of said element and of the door control means simultaneously.

16. In a fluid pressure brake, in combination, a brake valve device operable to control the brakes, a door engine, a member movable in opposite directions to effect operation of said brake valve device, an angularly movable member manually operable to move said first member, and a rotary member manually operable to effect movement of said first member independently of said angularly movable member and to control the operation of said door engine.

17. In a fluid pressure brake, in combination, a brake valve device operable to control the brakes, a fluid pressure actuated door engine, a member movable in opposite directions to effect operation of said brake valve device, an angularly movable member manually operable to move said member, a rotary member manually operable to effect movement of said member independently of said angularly movable member, and valve means for controlling the fluid pressure acting on said door engine, adapted to be operated by said rotary member.

18. In a fluid pressure brake, in combination, a brake valve device operative manually to control the brakes and also operative automatically to control the brakes, a control device for manually operating the said valve device and for also effecting operation of said valve device automatically, said control device comprising a casing, a pair of levers, one of said levers being pivoted at one end to one end of the other lever and being pivotally mounted on said casing at the other end thereof, and yielding means for urging the said one lever in one direction pivotally about the end pivoted on the casing to cause automatic operation of said valve device, said one lever being normally pivotally moved about the end pivoted on the casing in opposition to the said yielding means to prevent automatic operation of said valve device, the other of said levers being adapted to be pivotally moved relative to the said one lever to effect operation of said valve device manually.

19. In a fluid pressure brake, in combination, a brake valve device operative manually to control the brakes and also operative automatically to control the brakes, a control device for manually operating the said valve device and for also effecting operation of said valve device automatically, said control device comprising a casing, a pair of levers, one of said levers being pivoted at one end to one end of the other lever and being pivotally mounted on said casing at the other end thereof, yielding means for urging the said one lever in one direction pivotally about the end pivoted on the casing to cause automatic operation of said valve device, said one lever being normally pivotally moved about the end pivoted on the casing in opposition to the said yielding means to prevent automatic operation of said valve device, the other of said levers being adapted to be pivotally moved relative to the said one lever to effect operation of said valve device manually, and manually operative means adapted on bodily movement thereof to pivotally move the said one lever in opposition to the said yielding means, and upon rocking movement thereof to move the other of said levers relative to the said one lever.

DAVID W. LLOYD.